United States Patent [19]
Ooe et al.

[11] Patent Number: 5,737,743
[45] Date of Patent: Apr. 7, 1998

[54] DISK BLOCK CONTROLLER AND FILE SYSTEM WHICH SUPPORTS LARGE FILES BY ALLOCATING MULTIPLE SEQUENTIAL PHYSICAL BLOCKS TO LOGICAL BLOCKS

[75] Inventors: Kazuichi Ooe; Kazuto Kamimura, both of Kawasaki, Japan

[73] Assignee: Fujitsu Limited, Kawasaki, Japan

[21] Appl. No.: 490,589

[22] Filed: Jun. 15, 1995

[30] Foreign Application Priority Data

Jun. 17, 1994 [JP] Japan .................................. 6-135283
Dec. 27, 1994 [JP] Japan .................................. 6-324382

[51] Int. Cl.$^6$ .................................................. G06F 12/06
[52] U.S. Cl. .................................. 711/112; 395/621
[58] Field of Search .............................. 395/439, 441, 395/600, 616, 621

[56] References Cited

U.S. PATENT DOCUMENTS

| | | | |
|---|---|---|---|
| 5,021,946 | 6/1991 | Korty | 395/600 |
| 5,333,311 | 7/1994 | Whipple, II | 395/600 |
| 5,375,233 | 12/1994 | Kimber | 395/600 |
| 5,398,142 | 3/1995 | Davy | 360/48 |
| 5,416,915 | 5/1995 | Mattson | 395/441 |
| 5,551,003 | 8/1996 | Mattson | 395/463 |
| 5,557,770 | 9/1996 | Bhide | 395/488 |

*Primary Examiner*—Tod R. Swann
*Assistant Examiner*—Christpher Chow
*Attorney, Agent, or Firm*—Staas & Halsey

[57] ABSTRACT

A disk block controller and file system support large extended files by using special logical blocks which contain a number of sequential physical disk blocks. The disk block controller includes a file creation support unit, an extended management unit, a first and second management units, and an allocation unit. The file creation support unit separates free physical disk blocks into a region with a small number of sequential empty physical disk block spaces and a region with a large number of sequential empty physical disk block spaces, and allocates these regions to different parts of the disk. The extended management unit manages a start and sequential block numbers for sequential empty physical disk blocks having specified entries and is utilized for extended files whose logical block size is an integral multiple of a physical block. The first and second management units manages start and sequential block numbers for sequential empty physical disk block spaces that are not covered by the extended management unit. The allocation unit finds sequential empty physical disk blocks whose sequential block number is greater than the number requested according to the management data provided by the second management unit and is used for allocating as many sequential empty physical blocks as requested.

11 Claims, 20 Drawing Sheets

| BLOCK NO. | NEW BLOCK NO. | SEQUENTIAL BLOCK NO. | i-n o d e NO. |
|---|---|---|---|
| s0 |  | $l_0$ | -1 |
| 100 |  | 200 | 10 |
| ⟨ | ⟨ | ⟨ | ⟨ |

DISK BLOCK CONTROLLER AND FILE SYSTEM WHICH SUPPORTS LARGE FILES BY ALLOCATING MULTIPLE SEQUENTIAL PHYSICAL BLOCKS TO LOGICAL BLOCKS

BACKGROUND OF THE INVENTION

1. Field of the Invention

This invention relates to the disk block control system for a file that manages free physical disk block spaces to be allocated to a file. Particularly, the invention relates to the disk block space control system for a file that reduces the number of head searches and the latency speed for a disk during file access.

2. Description of the Related Art

A file cache mechanism to make file access faster is well known. When accessing a large file, it is not the file cache but the transfer capability of a hard disk that significantly affects performance. Therefore, there is a demand for a method that can reduce the number of head searches and the latency speed for a disk during file access.

Conventional file systems such as the UNIX file system employ the method that fixes a size of physical disk block space corresponding to that of a logical block in a file, and takes advantage of a list to manage numbers of free physical disk block spaces on a disk. If free physical disk block spaces are required for creating a file, the conventional systems find those blocks sequentially from the beginning of the list and allocate the sequential blocks to a file.

That is, as shown in FIG. 20, the conventional systems support a list that manages block numbers of free physical disk block spaces. If free physical disk block spaces are required for creating a file, the prior systems find free physical disk block spaces sequentially from the beginning of the list and allocate them to a file. The header part of the list is stored in main memory, and the rest of the list is stored on the disk.

Such conventional techniques, however, cause the problem that the number of head searches and the latency speed for a disk increase during file access. This is because the prior arts allow multiple free physical disk block spaces to be spread around the disk when performing block allocation.

A possible solution to this problem is to let one logical block correspond to an arbitrary number of sequential physical disk block spaces for each file as illustrated in FIG. 21.

However, the above solution cannot be implemented using a conventional list of free physical disk block spaces.

SUMMARY OF THE INVENTION

An object of this invention is to enable physical disk block spaces allocated in a file to be combined in a specific area on a disk and another object of this invention is to significantly reduce the number of head searches and the latency speed for a disk during file access.

Further object of this invention is to enable one logical block in a file to correspond to an arbitrary number of sequential empty physical disk block spaces and to significantly reduce the number of head searches and the latency speed for a disk during file access.

This invention provides the mechanism to separate free physical disk block space areas into an area used for a small number of sequential empty physical disk block spaces and an area used for a large number of sequential empty physical disk block spaces, and allocates these areas to different parts of the disk.

With this structure implemented, if a file creation unit makes a request to allocate a small number of sequential empty physical disk blocks, an allocation unit finds as many free physical disk blocks as requested in the corresponding area, according to the data managed by the management unit, and allocates them to a file.

On the contrary, if the file creation unit makes a request to allocate a large number of sequential empty physical disk block spaces, the allocation unit finds as many free physical disk block spaces as requested in the corresponding area according to the data managed by the management unit, and allocates them to a file.

If the number of free physical disk block spaces is insufficient during such an allocation, the change unit changes part of an area used for a large number of sequential empty physical disk block spaces into an area used for a small number of sequential empty physical disk block spaces. For a move operation, the condense unit only targets an area used for a small number of sequential empty physical disk block spaces. To generate a large number of sequential empty physical disk block spaces, the condense unit moves sequential empty physical disk block spaces or sequential physical disk block spaces allocated to a file from the target area.

Thus, this invention can combine physical disk block spaces to be allocated to a file in a specific area on the disk. Therefore, this method significantly reduces the number of head searches and the latency speed for the disk during file access.

This invention further comprises the extended management unit that is supported for an extended file whose logical block size is an integral multiple of a physical disk block space size. The extended management unit, consisting of the specified number of entries, manages the information such as start block numbers and the number of sequential blocks on sequential empty physical disk block spaces.

With this structure implemented, if the file creation unit makes a request to allocate free physical disk block spaces to an extended file, the allocation unit finds sequential free physical disk block spaces whose number is greater than that requested according to the data managed by the extended management unit, and allocates as many sequential empty physical disk block spaces as requested to the file.

Further, with the second management unit utilized, if a number requested for an allocation is less than a specified threshold, the allocation unit gives priority to the second management unit. By taking advantage of the data managed by the second management unit and the extended management unit, the allocation unit finds sequential empty physical disk block spaces whose number is greater than that requested and allocates as many sequential empty physical disk block spaces as requested. Or if the number requested for an allocation is greater than the specified threshold, the allocation unit finds sequential free physical disk block spaces whose number is greater than that requested according to the data managed by the extended management unit, and allocates as many sequential empty physical disk block spaces as requested to the file.

The update unit handles and records a logical block in an extended file whose size is larger than a specified threshold for the processing of physical disk block space release. If there is free space in the extended unit, the update unit records sequential empty physical disk block spaces possessed by the logical block space to the extended management unit. If there is no available space in the extended unit and the number of sequential empty physical disk block spaces is greater than the number of sequential blocks recorded, the update unit updates the data by replacing the existing number of sequential blocks with the blocks greater number of sequential. That is, using the update unit allows the extended management unit to manage sequential physical disk block spaces of which the number is greater.

As described above, this invention enables one logical block in a file to correspond to an arbitrary number of sequential empty physical disk block spaces. As a result, the present invention significantly reduces seek count and rotation wait time for disk during file access.

DETAILED DESCRIPTION OF THE PREFERRED EMBODIMENT

Figure 1:
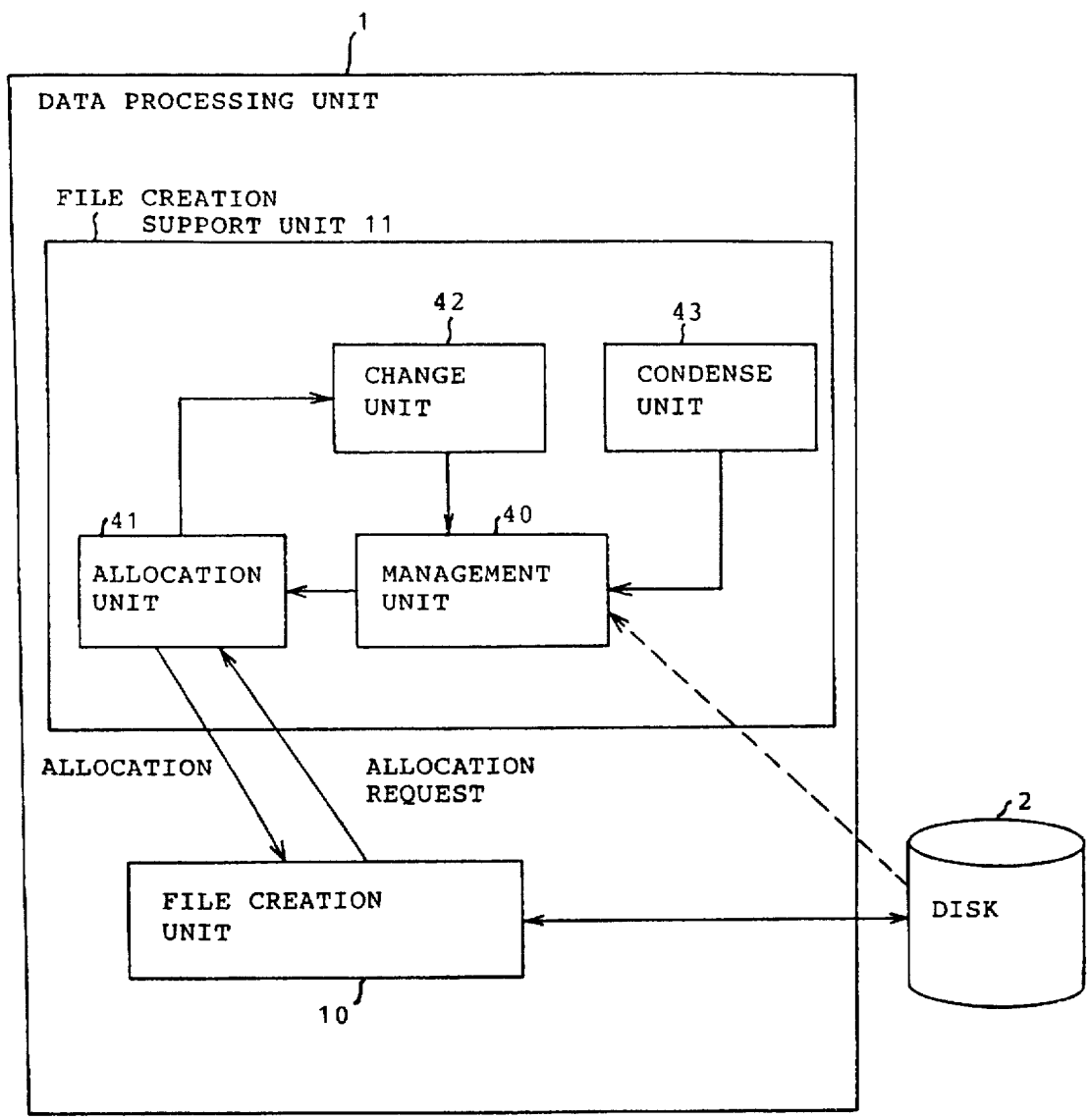
FIG. 1 shows a basic structure of the present invention.

Detailed explanation on this invention is hereafter provided using an embodiment:

FIG. 1 shows the basic structure of the present invention which employs the mechanism to separate free physical disk block space areas into an area used for a small number of sequential empty physical disk blocks and an area used for a large number of sequential empty physical disk block spaces, and allocates these areas to different parts of the disk 2.

With this structure implemented, if the file creation unit 10 makes a request to allocate a small number of sequential empty physical disk blocks, the allocation unit 41 finds as many free physical disk blocks as requested in the corresponding area, according to the data managed by the management unit 40, and allocates them to a file. On the contrary, if the file creation unit 10 makes a request to allocate a large number of sequential empty physical disk block spaces, the allocation unit 41 finds as many free physical disk block spaces as requested in the corresponding area according to the data managed by the management unit 40, and allocates them to a file.

If the number of free physical disk block spaces is insufficient during such an allocation, the change unit 42 changes part of an area used for a large number of sequential empty physical disk block spaces into an area used for a small number of sequential empty physical disk block spaces. For a move operation, the condense unit 43 only targets an area used for a small number of sequential empty physical disk block spaces. To generate a large number of sequential empty physical disk block spaces, the condense unit 43 moves sequential empty physical disk block spaces or sequential physical disk block spaces allocated to a file from the target area.

Figure 2:
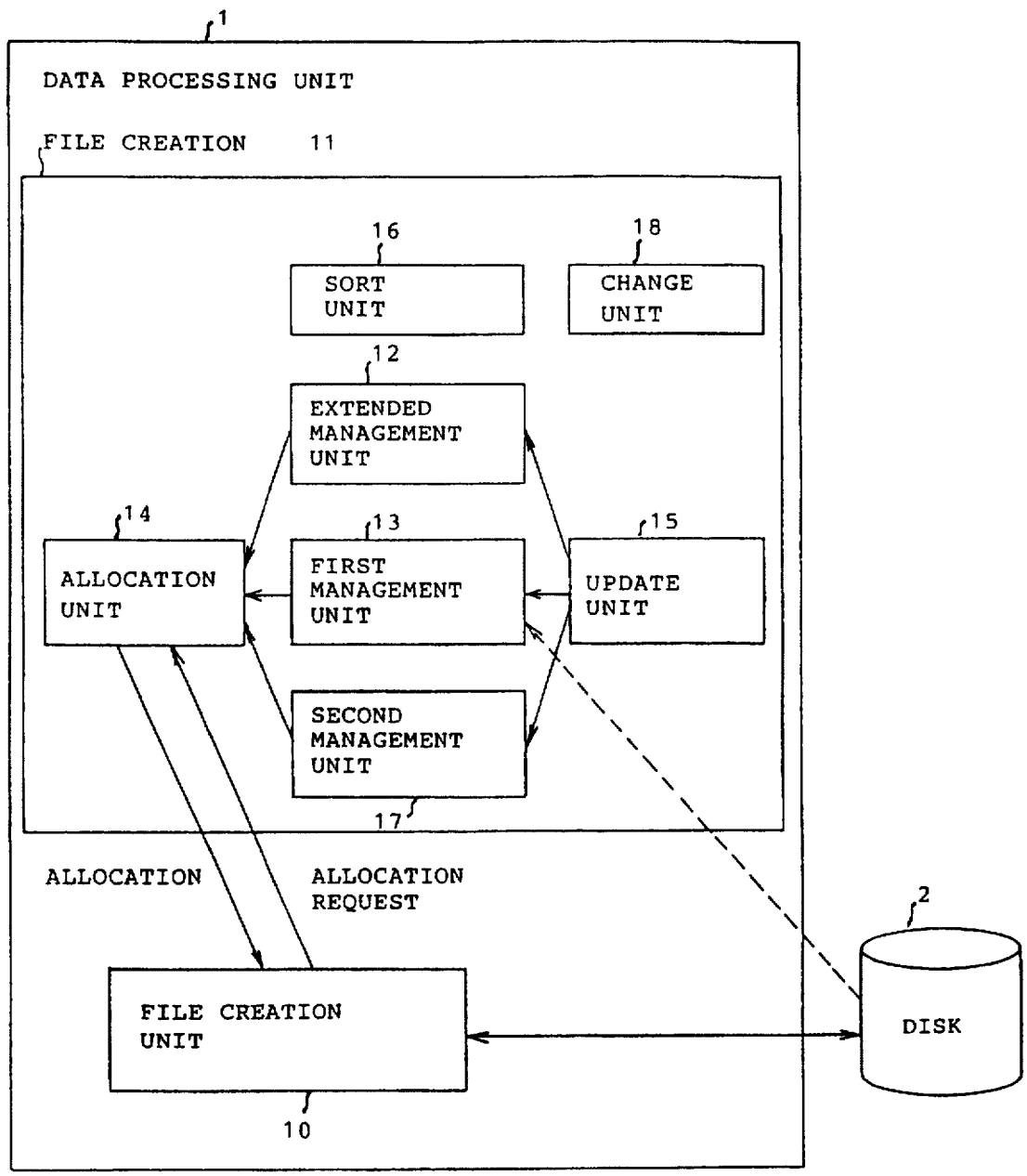
FIG. 2 shows a basic structure of the present invention.

FIG. 2 shows the basic structure of the present invention which comprises the extended management unit 12 that is supported for an extended file whose logical block size is an integral multiple of a physical disk block space size. The extended management unit 12, consisting of the specified number of entries, manages the information such as start block numbers and the number of sequential blocks on sequential empty physical disk block spaces.

With this structure implemented, if the file creation unit 10 makes a request to allocate free physical disk block spaces to an extended file, the allocation unit 14 finds sequential free physical disk block spaces whose number is greater than that requested according to the data managed by the extended management unit 12, and allocates as many sequential empty physical disk block spaces as requested to the file.

Further, with the second management unit 17 utilized, if a number requested for an allocation is less than a specified threshold, the allocation unit 14 gives priority to the second management unit 17. By taking advantage of the data managed by the second management unit 17 and the extended management unit 12, the allocation unit 14 finds sequential empty physical disk block spaces whose number is greater than that requested and allocates as many sequential empty physical disk blocks as requested. If the number requested for an allocation is greaser than the specified threshold, the allocation unit 17 finds sequential free physical disk block spaces whose number is greater than that requested according to the data managed by the extended management unit 12, and allocates as many sequential empty physical disk block spaces as requested to the file.

The update unit 15 handles and records a logical block in an extended file whose size is larger than a specified threshold for the processing of physical disk block space release. If there is free space in the extended management unit 12, the update unit 15 records sequential empty physical disk block spaces possessed by the logical block to the extended management unit 12. If there is no available space in the extended management unit 12 and the number of sequential empty physical disk block spaces is greater than the number of sequential blocks recorded, the update unit 15 updates the data by replacing the existing number of sequential blocks with the blocks whose number is greater. That is, using the update unit 15 allows the extended management unit 12 to manage sequential physical disk block spaces of which the number is greater.

Figure 3:
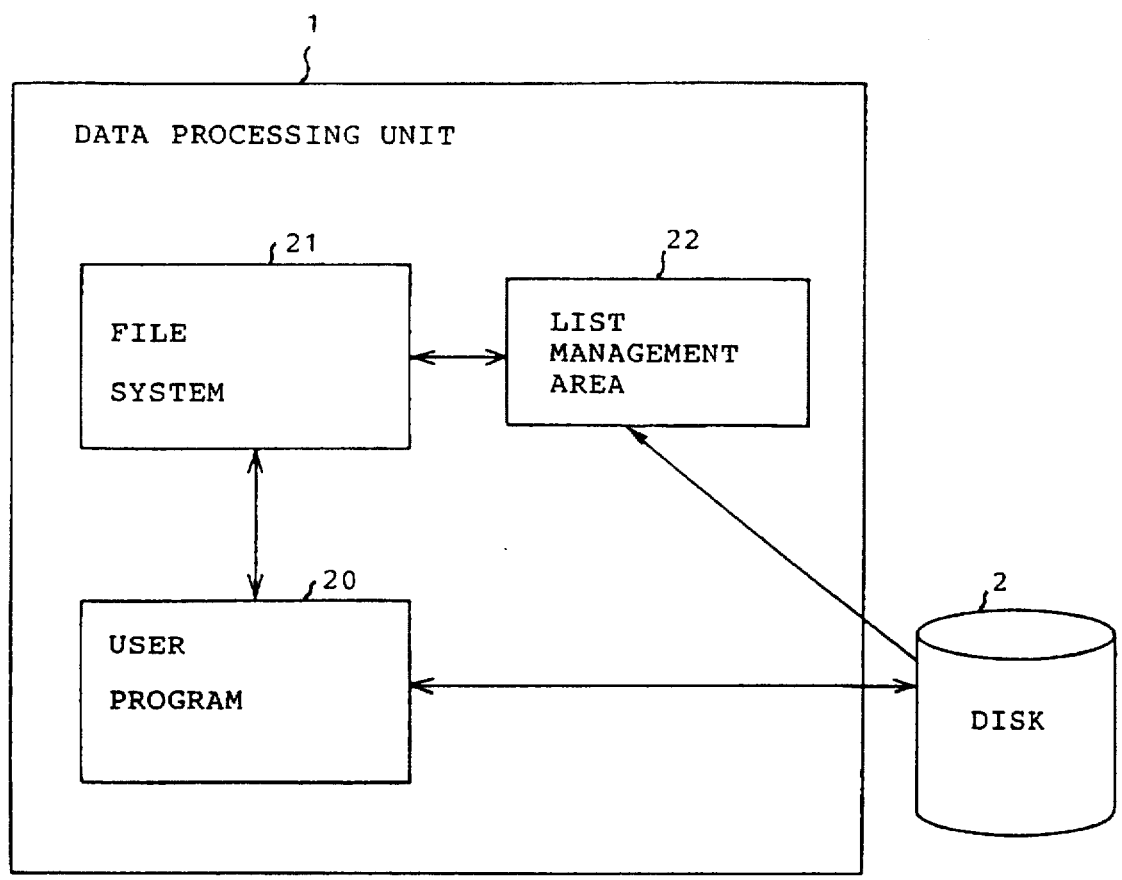
FIG. 3 shows the present invention.

FIG. 3 shows the data processing unit 1 in an embodiment of the invention.

In FIG. 3, 20 indicates a user program that creates a file. A reference number 21 indicates a file system that supports the processing of file creation performed by the user program 20. A reference number 22 indicates a list management area for managing free physical disk block spaces on the disk 2.

Figure 4:
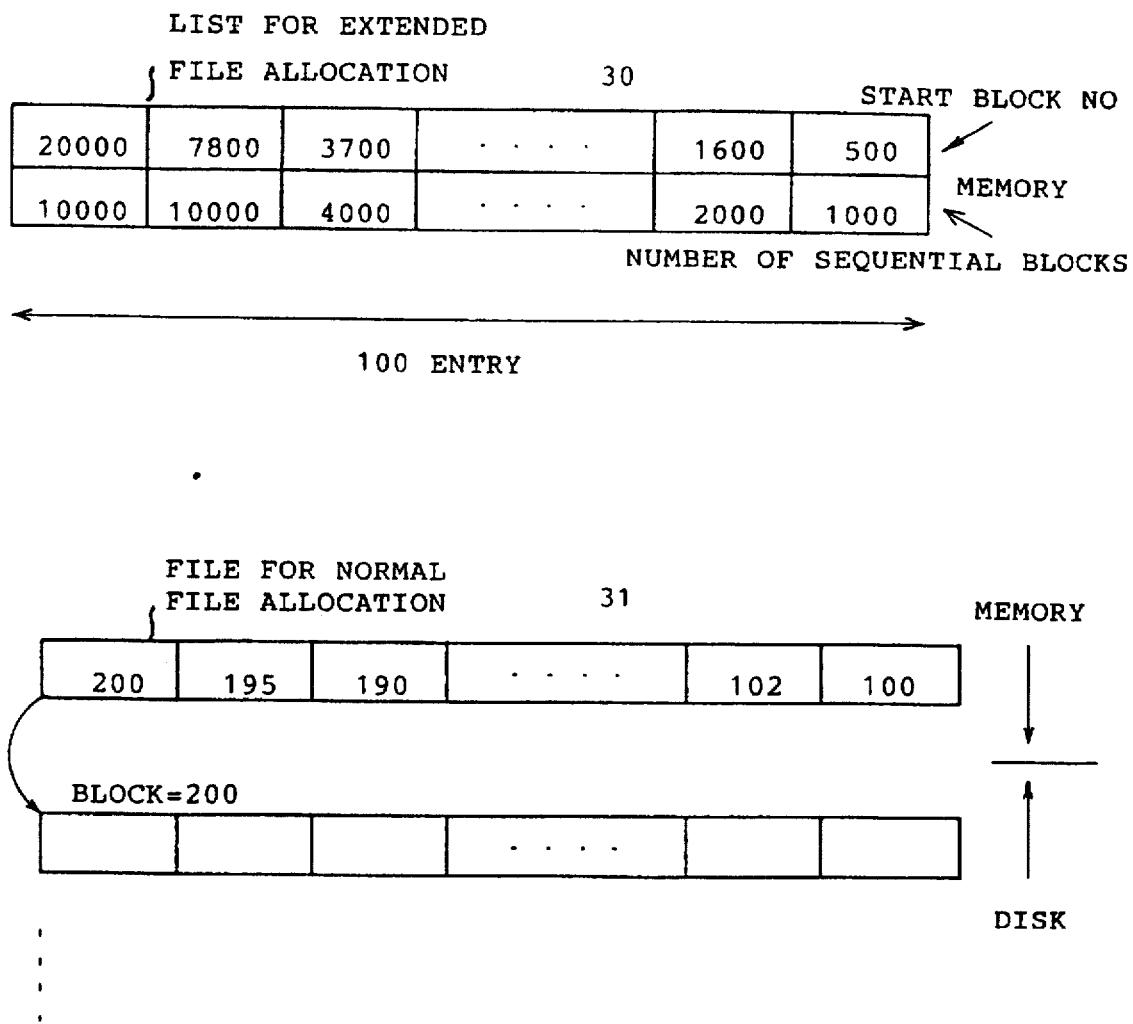
FIG. 4 shows the list in the list management area.

FIG. 4 shows managing information of free physical disk block spaces included in the list management area 22. In this embodiment, the list management area 22 manages the information on free physical disk block spaces on the disk 2 using the list for normal file allocation 31, to manage numbers of free physical disk block spaces that are not covered by the list for extended file allocation 30, as well as the list for extended file allocation 30 to manage start block numbers and the number of sequential blocks on the disk 2.

The list for normal file allocation 31 is equivalent to a conventional management list for free physical disk block spaces. The header part of the list is stored in the main memory, and the rest of the list is stored on the disk 2. Since the list for extended file allocation 30 imposes a limitation on the number of entries, it cannot manage all physical blocks on the disk 2. However, this does not matter for practical use. This is because the list for normal file allocation 31 can be used for allocating free physical disk block spaces to a file whose number of sequential blocks is too small.

Figure 5:
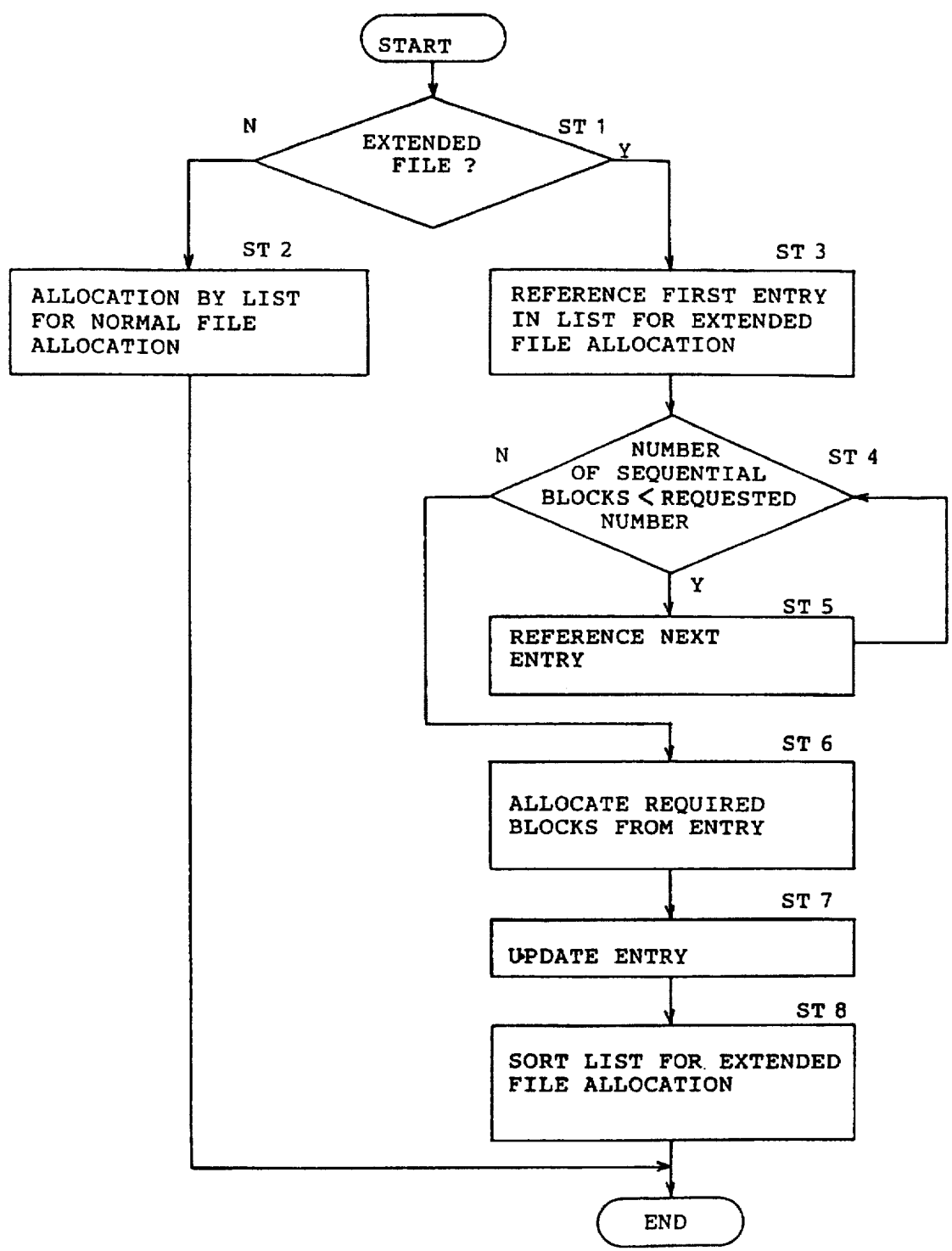
FIG. 5 shows the process flow for allocating free physical disk block spaces executed by the file system.
Figure 6:
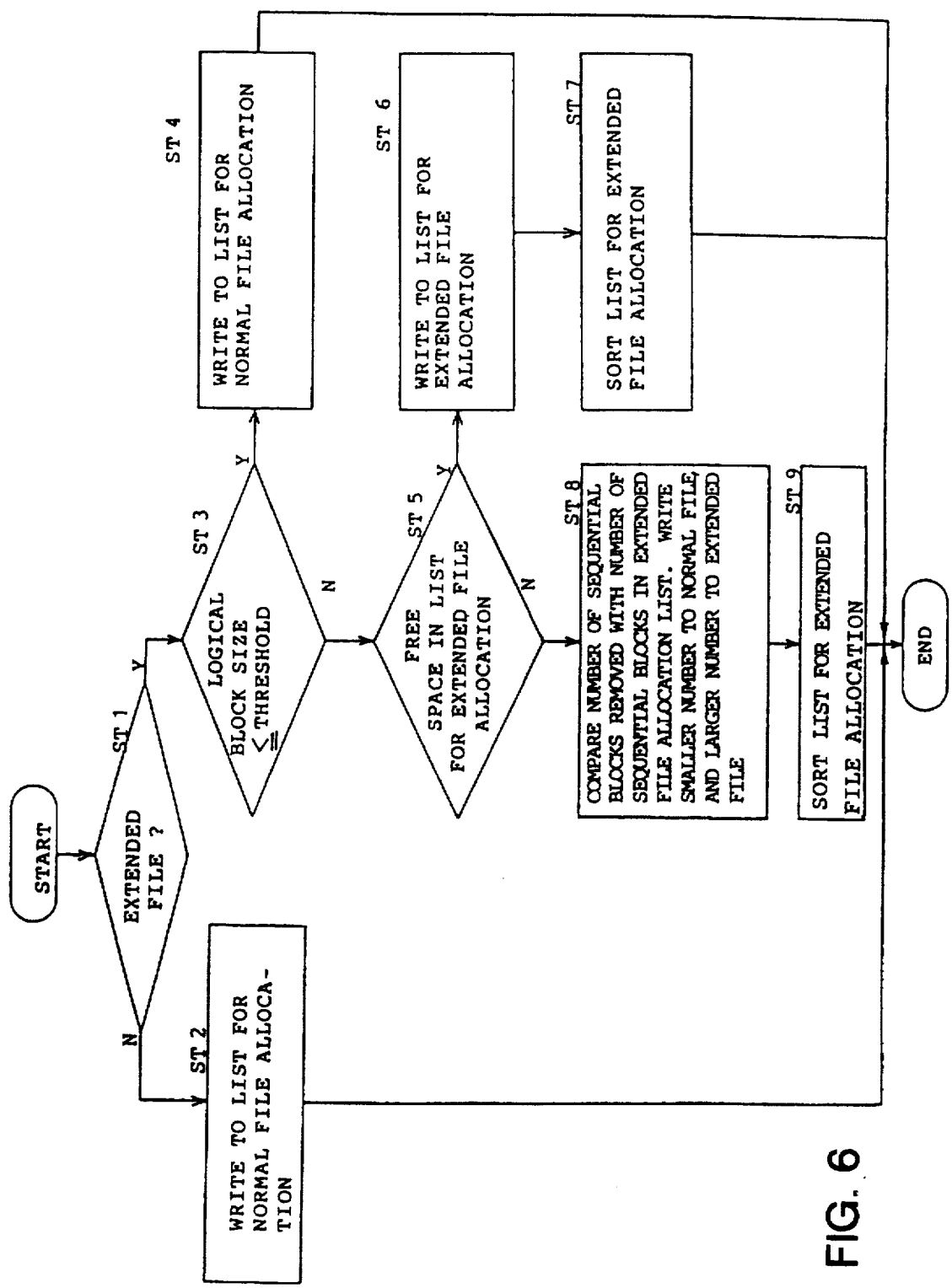
FIG. 6 shows the process flow for releasing physical disk blocks executed by the file system.

FIGS. 5 and 6 show the process flows executed by the file system 21 with this management method implemented. FIG. 5 shows the process flow for allocating free physical disk block spaces executed by the file system 21. FIG. 6 shows the process flow for releasing physical disk block spaces executed by the file system 21.

Detailed explanation on this invention is given below with reference to these flowcharts.

If the user program 20 makes a request to allocate free physical disk blocks to a file, the file system 21 first determines whether the file to be created is either extended or normal in step 1. The extended file is herein defined as a file that includes a logical block whose size is an integral multiple of a physical disk block space size, while the normal file is defined as a file that includes a logical block whose size is the same as that of a physical block. Whether a file to be created is normal or extended depends on, for example, a declaration made by the user program 20.

If the file to be created is determined as normal, the processing goes to Step 2 where the file system 21 finds free physical disk block spaces, allocates them to the file according to the first entry data in the list for normal file allocation 31, and terminates the processing. That is, this processing finds and allocates free physical disk block spaces in the same manner as conventional techniques.

Meanwhile, if the file to be created is determined as extended, the file system 21 references the first entry in the list for extended file allocation 30 in Step 3. Then, in step 4, the system checks to see if the number of sequential blocks in the first entry referenced in Step 3 is less than the number requested. If the former is less than the latter, the processing goes to Step 5 where the system references the second entry in the list for extended file allocation 30 and goes back to Step 4.

If the file system 21 encounters an entry where the number of sequential disk block spaces is greater than the number requested, the processing skips to Step 6, where the system finds as many sequential empty disk block spaces as requested from the start block number indicated by that entry and allocates them to the file. After the start block number and the number of sequential blocks in that entry are updated, all the entry data included in the list for extended file allocation is sorted according to the number of sequential blocks.

That is, for an extended file whose logical block size is an integral multiple of a physical block size, the file system 21 uses the list for extended file allocation 30 to allocate sequential empty physical disk blocks according to the FIG. 5 process flow.

Additionally, if the user program 20 makes request to release physical disk block spaces included in the file, the file system 20 first determines whether the file is normal or extended in FIG. 6 Step 1. If the file is determined as normal, information for the physical disk block spaces to be released is written to the list for normal file allocation 31 in Step 2.

On the contrary, if the file is determined as extended in Step 1, the processing goes to Step 3 where the file system 21 checks to see if the size of physical blocks in the extended file is equal to or smaller than the specified threshold. If so, the processing goes to Step 4 where information for the sequential physical disk block spaces to be released is written to the list for normal file allocation 31, as a final step.

If the logical block size of the extended file is evaluated to be equal to or greater than the specified threshold in Step 3, the file system 21 checks to see if there is free space in the list for extended file allocation 30. If available space exists, the sequential physical disk block spaces to be released are written to the list for extended file allocation 30 in Step 6. Finally, all the entry data in the list for extended file allocation 30 are sorted according to the number of sequential blocks in Step 7.

If there is no available space in the list for extended file allocation 30 in Step 5, the processing skips to Step 8 where the file system 21 compares the number of sequential physical disk block spaces to be released with the existing number of sequential blocks in the list for extended file allocation 30. In the case that the number of sequential physical disk block spaces to be released is less than the existing number in the list, the sequential physical disk block spaces to be released are written to the list for normal file allocation 30. Otherwise, the file system 21 replaces the existing data with the smallest entry data in the list for extended file allocation. At the same time, the entry data to be replaced is written to the list for normal file allocation 31. Finally, the entry data in the list for extended file allocation 30 is sorted according to the number of sequential blocks in Step 9.

As described above, whenever releasing physical disk block spaces in an extended file, the file system 21 performs the processing so that the list for extended file allocation 30 can manage a greater number of sequential blocks, according to the FIG. 6 process flow.

Figure 7:
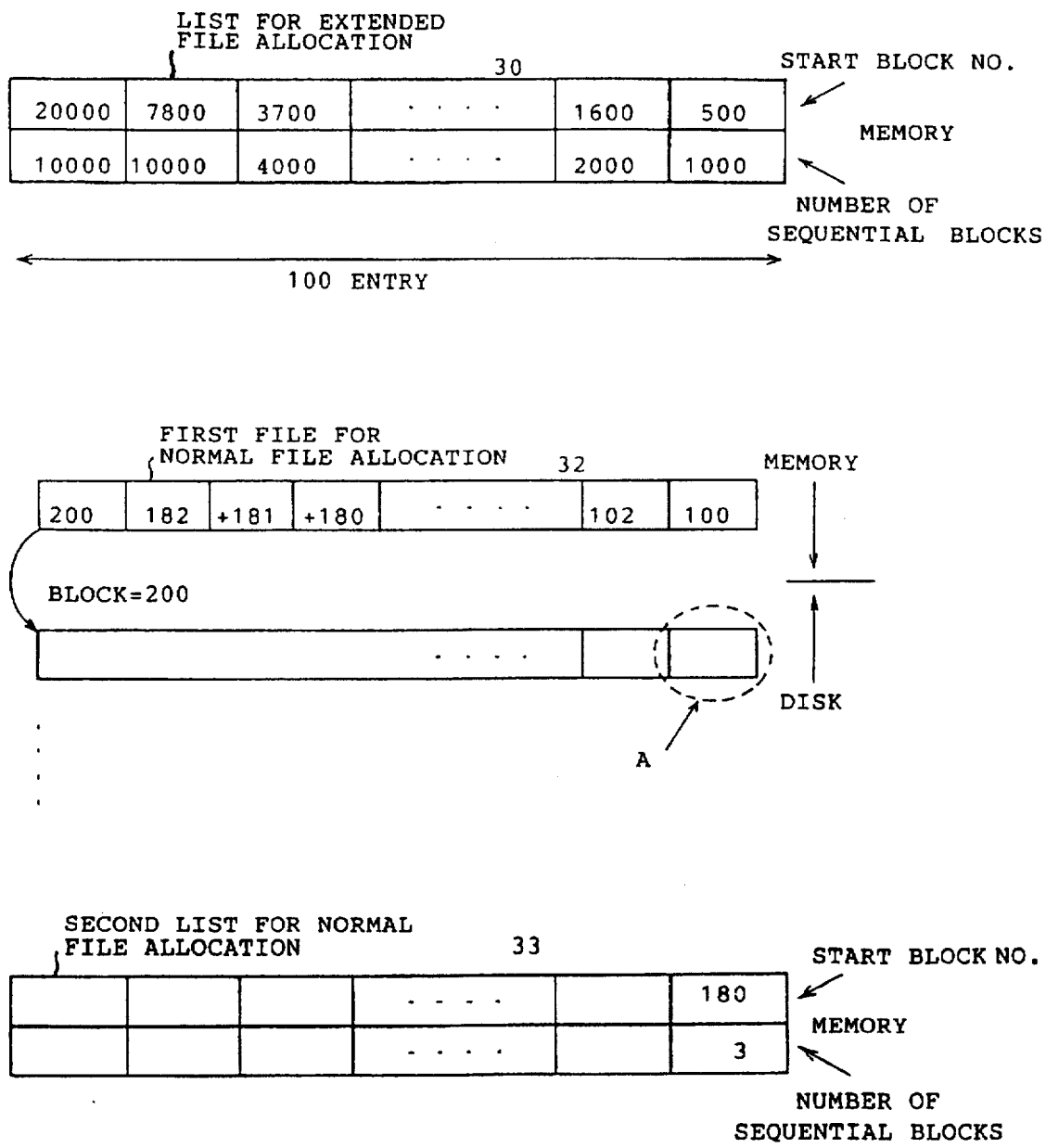
FIG. 7 shows the list in the list management area.

FIG. 7 shows an embodiment of managing listed information on free physical disk block spaces in the list management area 22.

In this embodiment, the list management area manages sequential empty physical disk block spaces on the disk 2 using three lists: the list for extended file allocation 30, the first list for normal file allocation 31 that manages free physical disk block space numbers not covered by the list for extended file allocation 30, while chaining the numbers if some of the blocks are sequential, and the second list for normal file allocation 33 that manages information such as start block numbers and the number of sequential blocks on sequential empty physical disk block spaces managed in the first list for normal file allocation 32.

Figure 8:
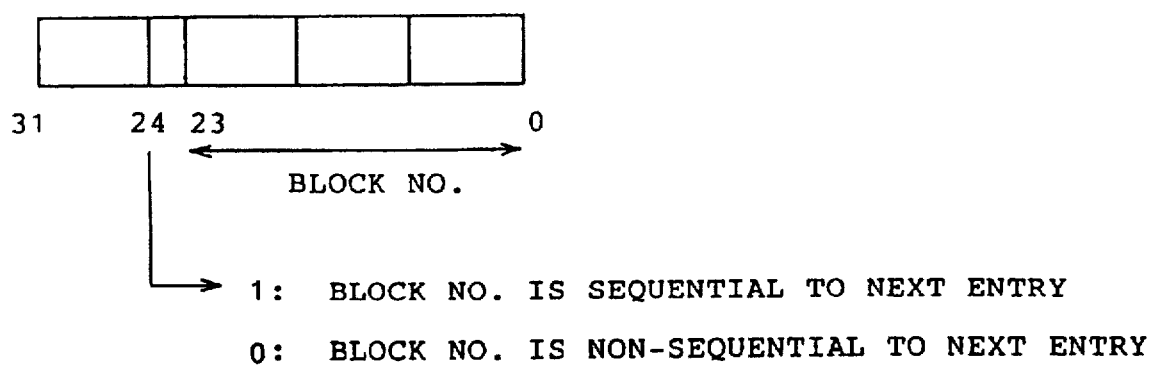
FIG. 8 shows the management data in the first list for normal file allocation.

The first list for normal file allocation 32, for example, as illustrated in FIG. 8, manages free physical disk block space numbers in the lower 24 bits of 32-bit data as shown in FIG. 8. The twenty-fourth bit is a flag that indicates whether or not one block number is sequential to another block number. That is, the first list for normal file allocation 32 manages physical disk block space numbers not covered by the list for extended file allocation 30 while chaining the numbers if any of them are sequential. The second list for normal file allocation 33 is saved at the time the file system 21 reaches the A portion of the last entry as shown in FIG. 7.

Figure 9:
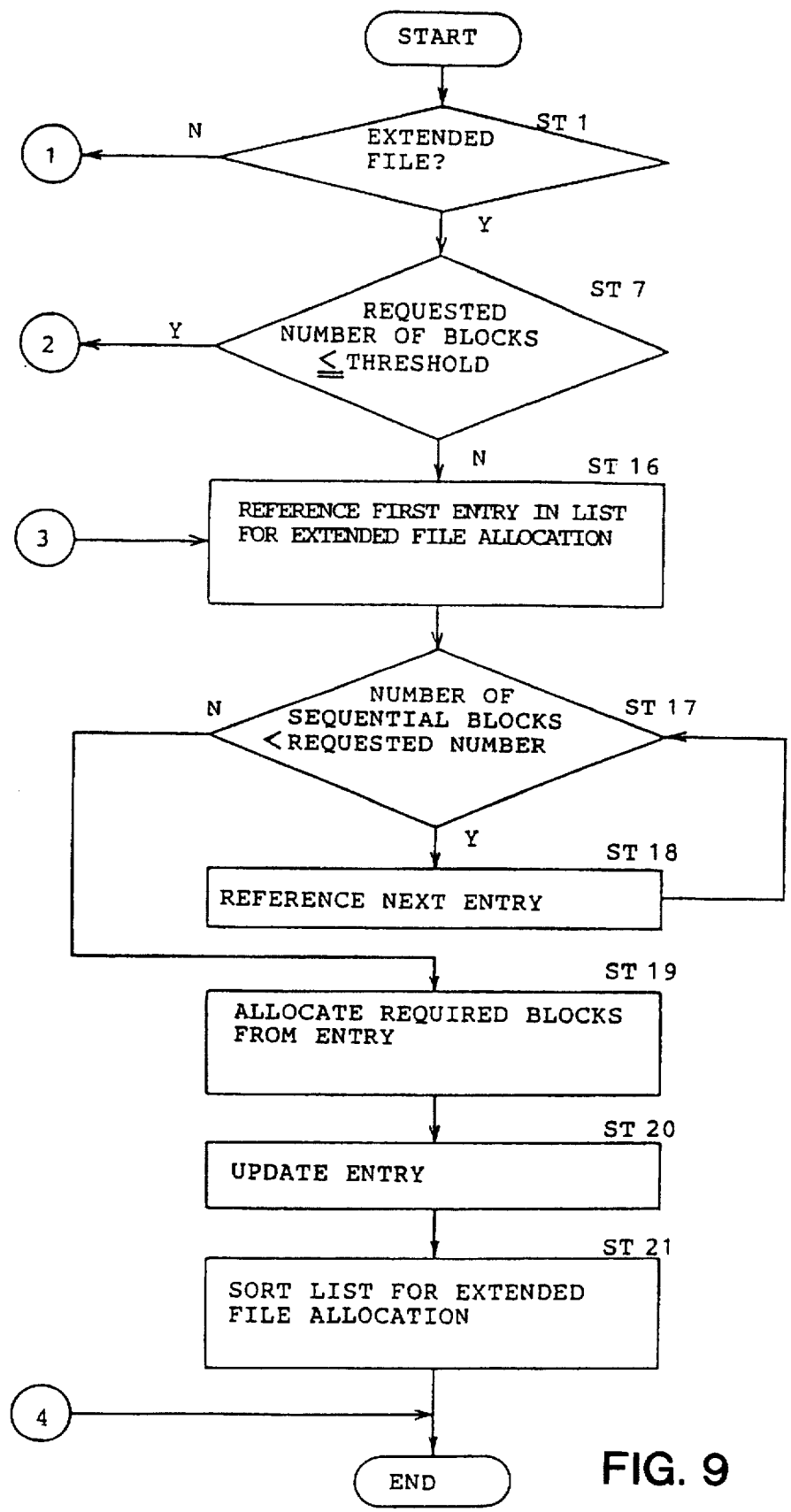
FIG. 9 shows the process flow for allocating free physical disk block spaces executed by the file system.
Figure 10:
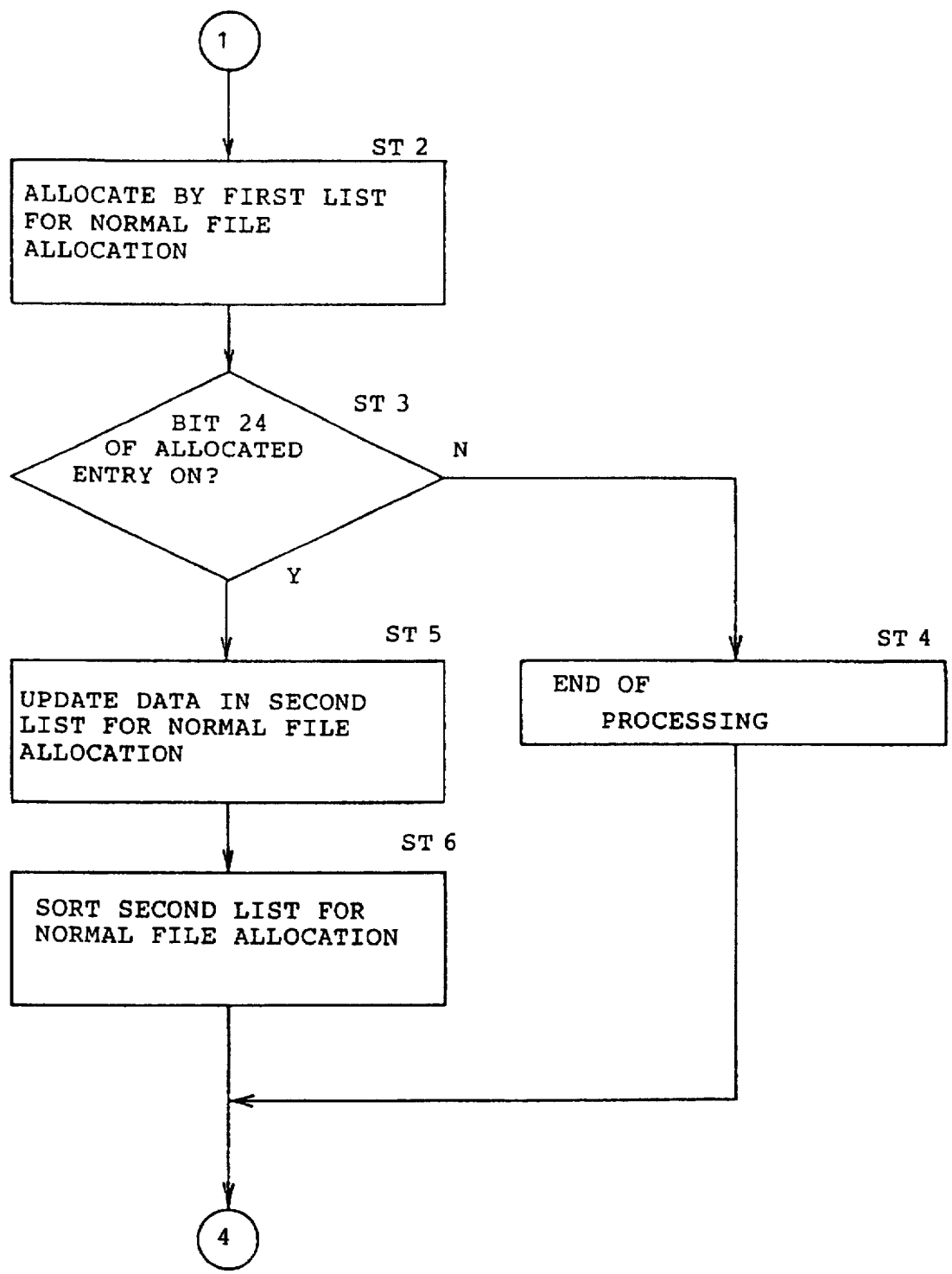
FIG. 10 shows the process flow for allocating free physical disk block spaces executed by the file system.
Figure 11:
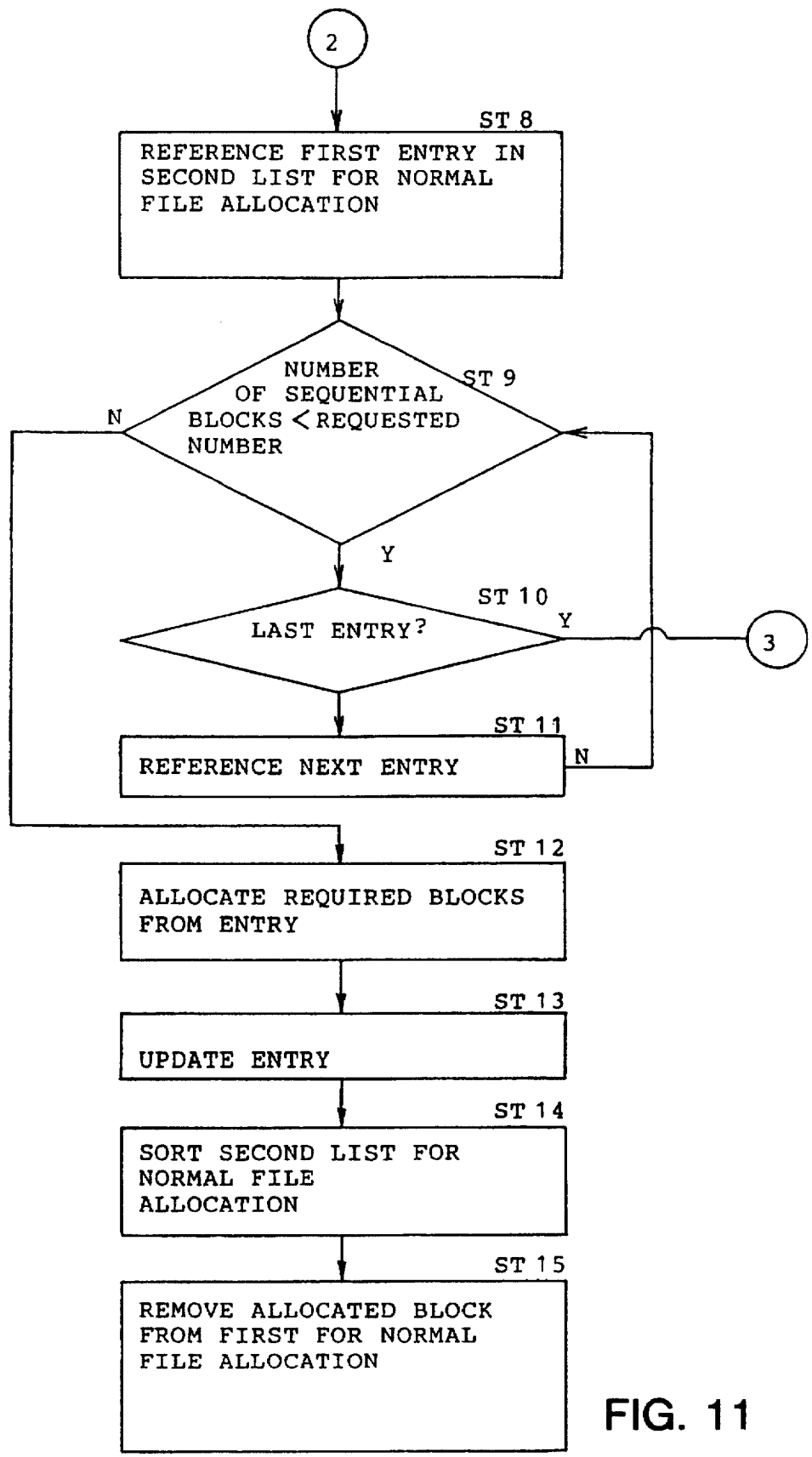
FIG. 11 shows the process flow for allocating free physical disk block spaces executed by the file system.
Figure 12:
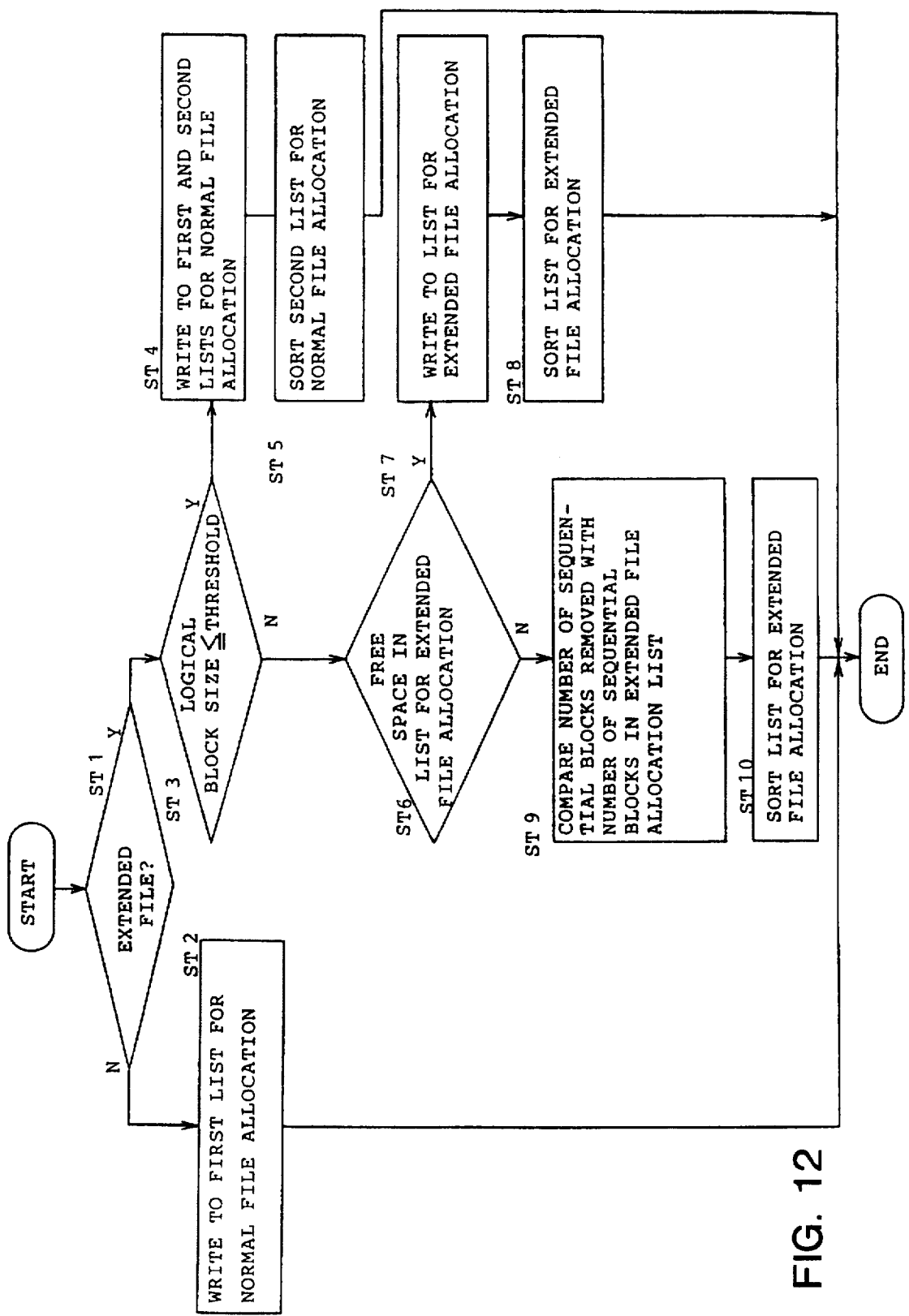
FIG. 12 shows the process flow for releasing physical disk block spaces executed by the file system.

FIGS. 9 through 12 show the process flow executed by the file system 21 with this management method implemented. FIGS. 9 through 11 show the process flow for allocating free physical disk block spaces performed by the file system 21. FIG. 12 shows the process flow for releasing physical disk block spaces performed by the file system 21.

Detailed explanation on this invention is given below referring to these flowcharts.

If the user program 20 makes a request to allocate free physical disk block spaces to a file, the file system 21 first determines whether the file to be created is normal or extended in Step 1 as shown in the FIG. 9 through FIG. 11 process flow. If the file to be created is determined as normal, the processing goes to Step 2 in FIG. 10, where the file system 21 finds free physical disk block spaces according to the first entry data in the first list for normal file allocation 31, and allocates them to the file.

In the next Step 3, the file system 21 determines whether or not the twenty-fourth bit of that entry indicates chaining. If the twenty-fourth bit does not indicate chaining, the processing is terminated in Step 4. If the bit 24 indicates chaining, the entry data in the second list for normal file allocation 33, which is changed due to reallocation of free physical disk block spaces, is updated in Step 5 and all the data in the second list for normal file allocation are sorted according to the number of sequential blocks in Step 6, and the process is terminated.

Meanwhile, if the file to be created is determined as extended, the processing goes to Step 7 where the file system 21 determines whether or not the requested number of blocks is equal to or less than the specified threshold. If the requested number is evaluated to be equal to or less than the specified threshold, the first entry in the second list for normal file allocation 33 is referenced in step 8 of FIG. 11.

Next, the file system 21 determines whether or not the number of sequential blocks in the referenced entry is less than the requested number in Step 9. If the referenced number is evaluated to be less than the requested number, the file system 21 determines whether or not the referenced entry is the last one in Step 10. If it is the last entry, the processing goes to Step 16 in FIG. 9, to be described later. If it is not the last entry, the processing goes to step 11 to reference the next entry in the second list for normal file allocation 33, and then goes back to Step 9.

If the file system 21 encounters an entry that possesses sequential blocks whose number is greater than the requested number in the second list for normal file allocation 33 in Step 9, the processing skips to Step 12 where the file system 21 finds as many sequential empty physical disk block spaces as requested starting from the block indicated by that entry, and allocates them to the file. After the start block number and the number of sequential blocks in that entry are updated in the next Step 13, all the entry data in the second list for normal file allocation 33 are sorted according to the number of sequential blocks. Lastly, the file system 21 deletes information for the allocated physical disk block spaces from the first list for normal file allocation 32 in Step 15.

On the contrary, if the requested number of blocks is equal to or greater than the specified threshold in Step 7 of FIG. 9, the processing goes to Step 16 in FIG. 9. Or if the file system 21 determines the second list for normal file allocation 33 does not include a number of sequential blocks greater than the requested number in Step 10 of FIG. 11, the processing goes to Step 16 in FIG. 9, even if the requested number is less than the specified threshold. After the first entry in the list for extended file allocation 30 is referenced in Step 16, the file system 21 determines whether or not the number of sequential blocks in the referenced entry is less than the requested number. If the number of sequential blocks is evaluated to be less, the next entry in the list for extended file allocation 30 is referenced and the processing goes back to Step 17.

If the file system 21 encounters an entry whose sequential disk block number is greater than the requested number in Step 17, the system finds as many sequential empty physical disk block spaces as requested starting from the block indicated by that entry, and allocates them to the file in Step 19. After the start block number and the number of sequential blocks in that entry are updated in Step 20, all the entry data in the list for extended file allocation 30 are sorted finally according to the number of sequential blocks in Step 21.

As described above, the file system 21 gives priority to the second list for normal file allocation 33 for handling a logical block whose size is an integral multiple of physical disk block space size if the requested number of blocks is less than the specified threshold as shown in the FIG. 9 through FIG. 11 process flow. To allocate sequential empty physical disk block spaces, the file system 21 makes use of the list for extended file allocation 30 in addition to the second list for normal file allocation 33. If the requested number is greater than the specified threshold, the system only uses the list for extended file allocation 30 to allocate sequential empty physical disk block spaces.

Furthermore, if the user program 20 makes a request to release physical disk block spaces in the file, the file system 21 determines whether the file is normal or extended in Step 1 as shown in the FIG. 12 process flow. If the file is determined as normal, the physical disk block spaces to be released are written to the first list for normal file allocation 32 in Step 2, and the process is terminated.

If the file in question is determined as extended in Step 1, the file system 21 determines whether or not the logical block size in that file is equal to or smaller than the specified threshold in Step 3. If the logical block size is evaluated to be equal to or less than the threshold, information for sequential empty physical disk block spaces to be released is written to the first and second lists for normal file allocation 32 & 33 respectively, in Step 4. Finally, all the entry data in the second list for normal file allocation 33 are sorted according to the number of sequential blocks in Step 5.

If the logical block size in the extended file whose physical disk blocks are released is equal to or greater than the threshold, the processing skips to Step 6 where the file system 21 determines whether or not there is free space in the list for extended file allocation 30. If available space exists, information for the sequential physical disk block spaces to be released is written to the list for extended file allocation 30. Finally, all the entry data in the list for extended file allocation 30 are sorted according to the number of sequential blocks in Step 8.

If the file system 21 cannot find enough room in the list for extended file allocation 30, the processing skips to Step 9 where the system compares the number of sequential physical disk block spaces to be released with the existing entry data in the list for extended file allocation. If the former is less than the latter, the former is written to the first and second lists for normal file allocation 32 & 33, respectively. If the number of sequential physical disk block spaces to be released is greater than the existing data, the former replaces the smallest entry data in the list for extended file allocation. At the same time, the entry data to be replaced in the list for extended file allocation 30 is written to the first and second lists for normal file allocation 32 & 33, respectively. In Step 10, all the data in the list for extended file allocation 30 are sequentially sorted according to the number of sequential blocks as a final step.

Thus, the file system 21 performs the processing so that the list for extended file allocation 30 can manage a larger number of sequential blocks whenever releasing physical disk block spaces as shown in the FIG. 12 process flow.

Therefore, the file system 21 allows one logical block in the file to correspond to an arbitrary number of sequential physical disk block spaces. As a result, it leads to a significant reduction of the number of head searches and the latency speed for the disk 2 during file access.

Figure 13:
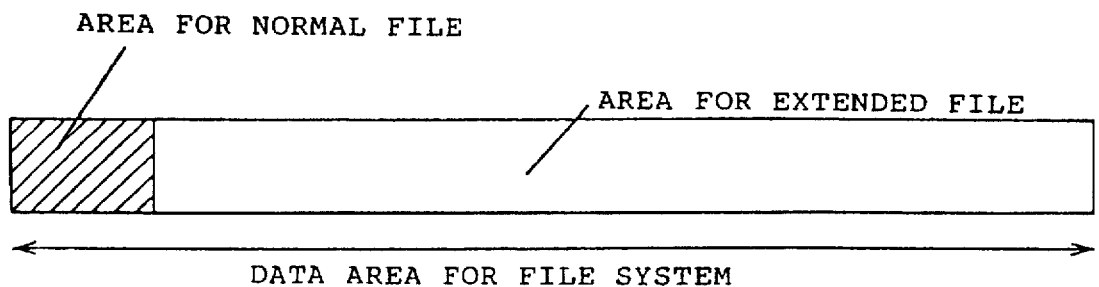
FIG. 13 shows the data area for the file system onto disk.
Figure 14:
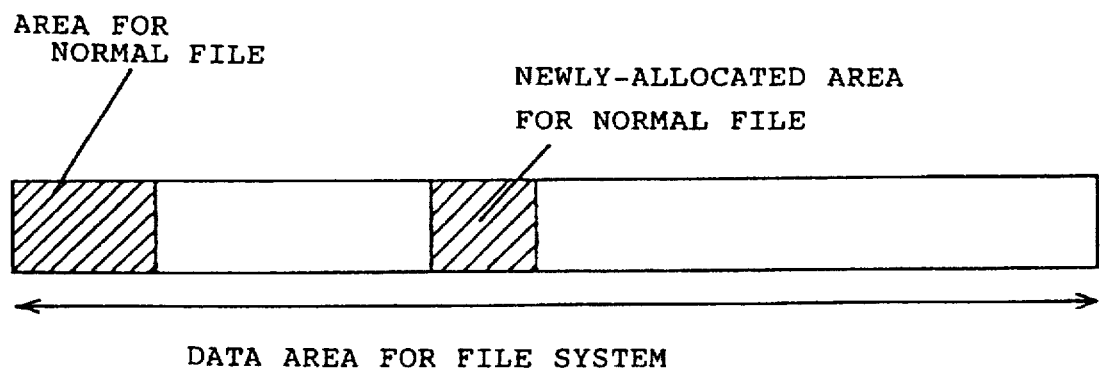
FIG. 14 shows the additional processing in the area for normal file.

The embodiment described above does not refer to regions to allocate both an area used for free physical disk block spaces in an extended file and an area used for free physical disk block spaces in a normal file on the disk 2. It may be desirable that these two areas should respectively be allocated to different parts of the disk 2 as shown in FIG. 13. This is because allocating to different areas enables seek count and rotation wait time for the disk 2 to be even further reduced.

With this method implemented, it may sometimes arise that the number of free physical disk block spaces is insufficient in an area used for those blocks. In this case, the file system 21 secures as many free physical disk block spaces as needed according to the information provided by the list for extended file allocation 30, and allocates them to a normal file.

Figure 15:
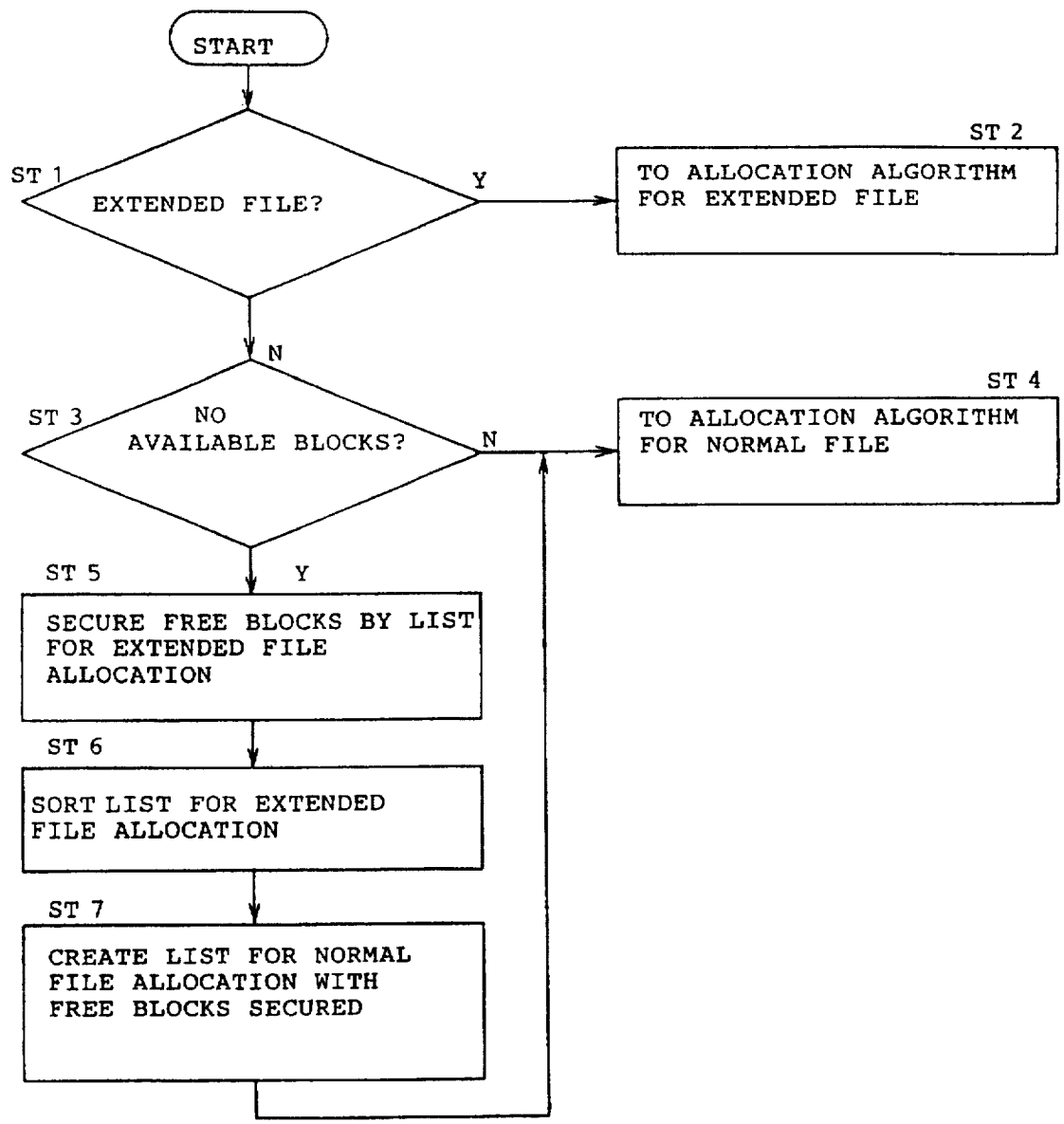
FIG. 15 shows the process flow executed by the file system.

If the user program 20 makes a request to allocate free physical disk block spaces to the file, the file system 21 determines whether the file to be created is normal or extended in Step 1, as shown in the FIG. 15 process. If the file is determined as extended, free physical disk block spaces are allocated to the file in Step 2 according to the above-mentioned algorithm shown in FIGS. 9 through 12 for extended file.

If the file to be created is determined as normal, the processing goes to Step 3 where the file system 21 determines whether or not there are free physical disk block spaces in the list for normal file allocation 31. In the case that there are available blocks, they are allocated to the file in Step 4 according to the above-mentioned algorithm for normal file allocation.

Meantime, if there are no available free physical disk block spaces in the list for normal file allocation 31, the file system 21 secures as many free physical disk block spaces as needed according to the information provided by the list for extended file allocation 30, in Step 5. Next, in Step 6, all the entry data in the list for extended file allocation 30 are sorted according to the number of sequential blocks. After the file system 21 creates the list for normal file allocation 31 using the secured free physical disk block spaces, the processing goes back to Step 4 in order to allocate those blocks to the file according to the above-mentioned algorithm for normal files.

The embodiment described above does not refer to the condense unit that combines free physical disk block spaces. Free physical disk block spaces that are spread around cause the number of head searches and the latency speed to increase on the disk 2. Therefore, it may be desirable to make good use of the condense unit.

Figure 16:
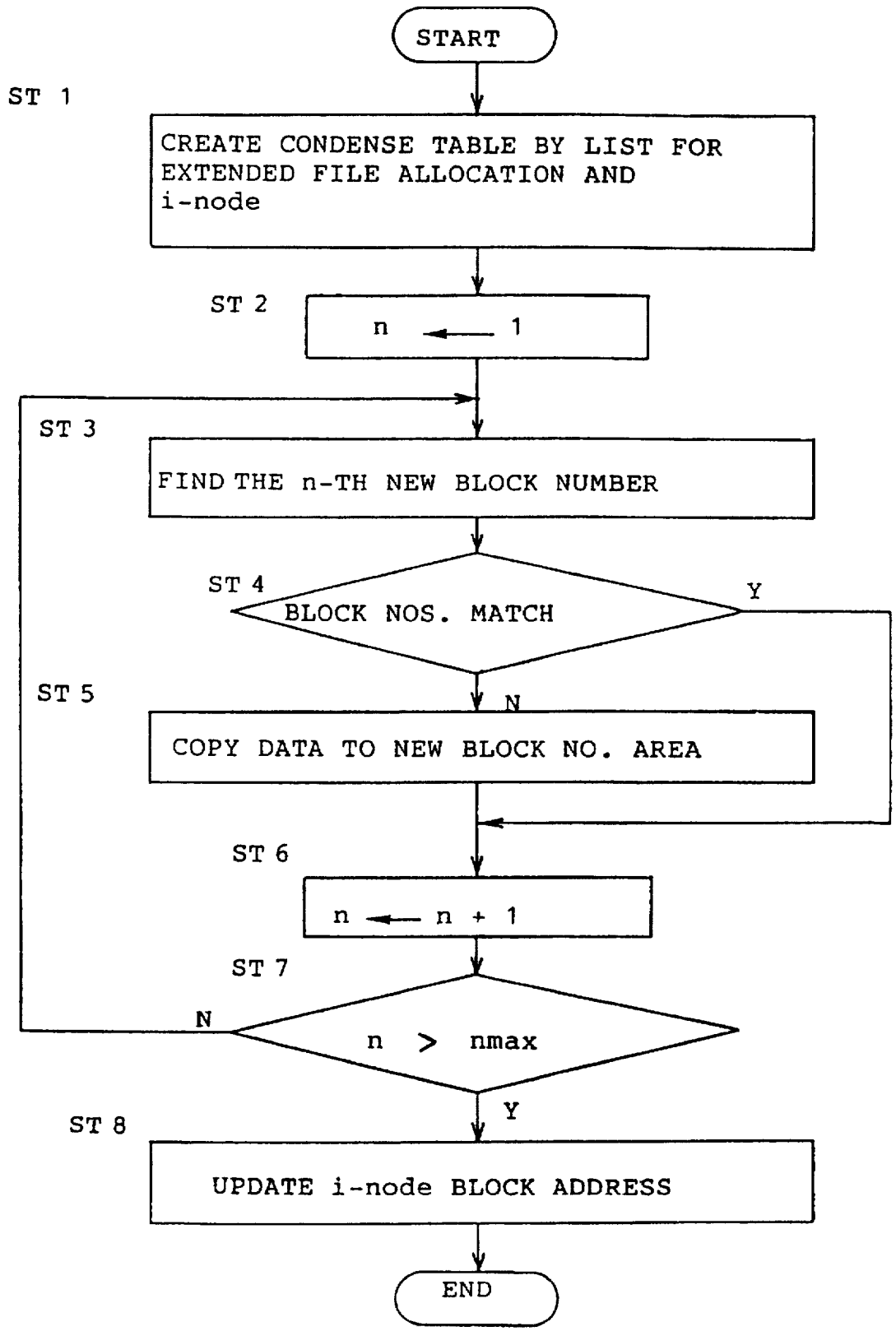
FIG. 16 shows the process flow for the condense processing executed by the file system.
Figure 17:
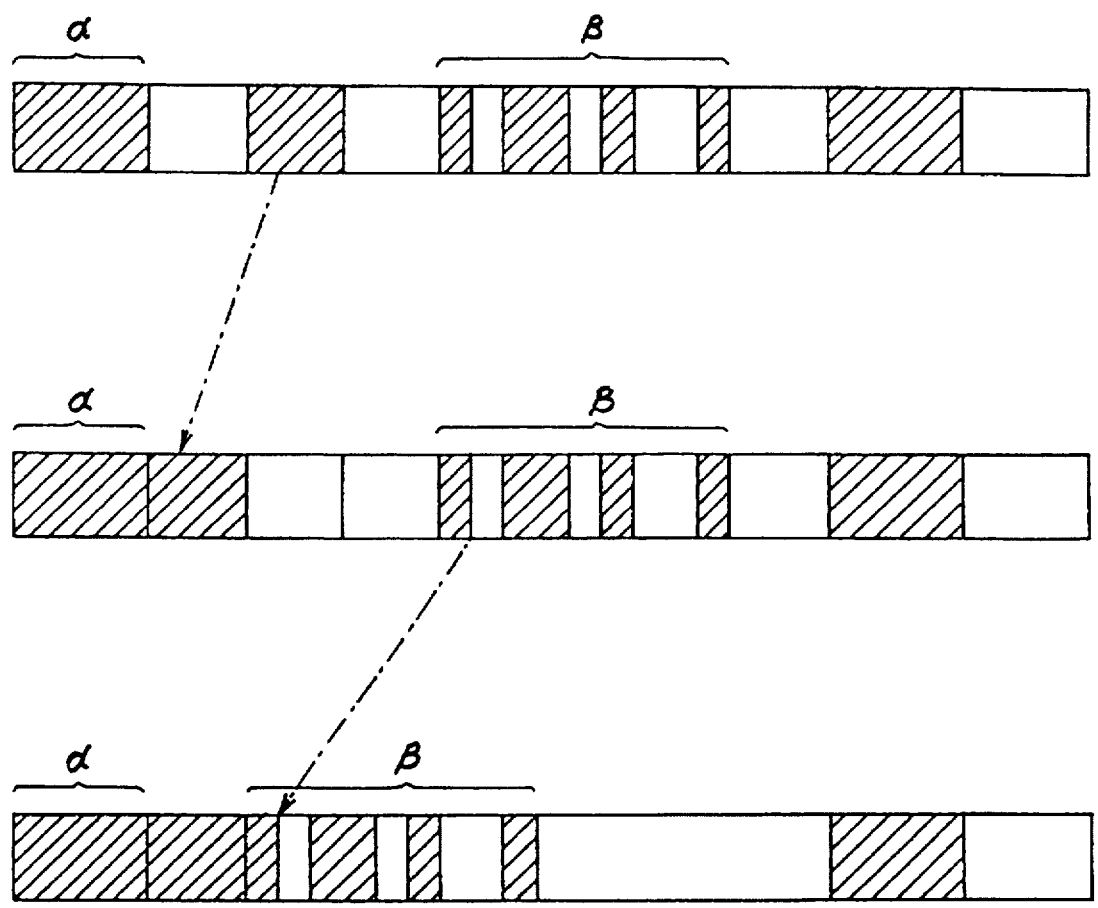
FIG. 17 shows the process flow executed by the file system.

FIG. 16 shows the flowchart for the condense processing. As shown in FIG. 17, the file system 21 handles block areas available for free physical disk block spaces to be allocated to a normal file (indicated by $\lambda$ and $\beta$ in FIG. 17); as one body, and performs the condense processing to combine sequential empty physical disk block spaces.

If a request for the condense processing is made when reaching a specific condition, the file system 21 creates a condense table using a file i-node, in addition to the list for extended file allocation 30 in Step 1, as shown in the FIG. 16 flowchart. The condense table manages information on physical disk block spaces allocated to an extended file and information on block areas used for free physical disk block spaces to be allocated to a normal file.

Figures 18A, 18B:
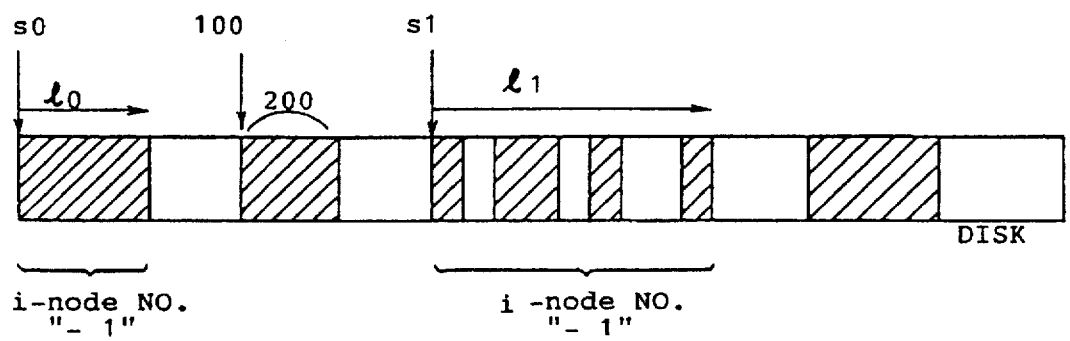
FIGS. 18A and 18B show the condense table.

FIG. 18A shows the condense table. The condense table manages the information on the sequential physical disk block spaces allocated to an extended file such as block number, block number of a newly-set area, sequential block number, and i-node number. The condense table also manages the information on a normal file such as block number of a free physical disk block area whose blocks are to be allocated to a normal file, block number of a newly-set block area, vector length of a new area, and i-node number for the block area, as shown in FIG. 18A. The Block numbers, listed in ascending order herein, indicate where to be stored on the disk 2. If an i-node number is −1, the data are not sequential physical disk block spaces allocated to an extended file, but a block area used for free physical disk block spaces to be allocated to a normal file.

After the file system 21 creates the condense table in Step 1, the entry variable n is set to 1 in Step 2. Then, in Step 3, the file system 21 finds the block number in the condense table indicated by the value of the entry number n, and calculates a new block number as a destination. That is, the file system 21 computes a new block number defined as a number that follows the block number previously processed.

Next, the file system 21 checks to see if the source block number matches the destination block number, in step 4. If both numbers do not match, the data of the area specified by the source block number is copied to the area specified by the destination block number, in Step 5. In the next Step 6, the value of the variable n is incremented. If the source block number matches the destination block number in Step 4, the processing skips to Step 6 to increment the entry variable n.

Then, the file system 21 checks to see if all the data included in the condense table are processed in Step 7. If the data are yet to be processed, the processing goes back to Step 3. If completed, the block address indicated by the i-node number in the condense table is replaced with a new block number in Step 8, finally.

Thus, while handling areas used for free physical disk block spaces to be allocated to a normal file as one body, the file system 21 performs the condense processing to combine sequential empty physical disk block spaces. Implementing this unit greatly reduces the number of head searches and the latency speed for the disk 2.

Figure 19:
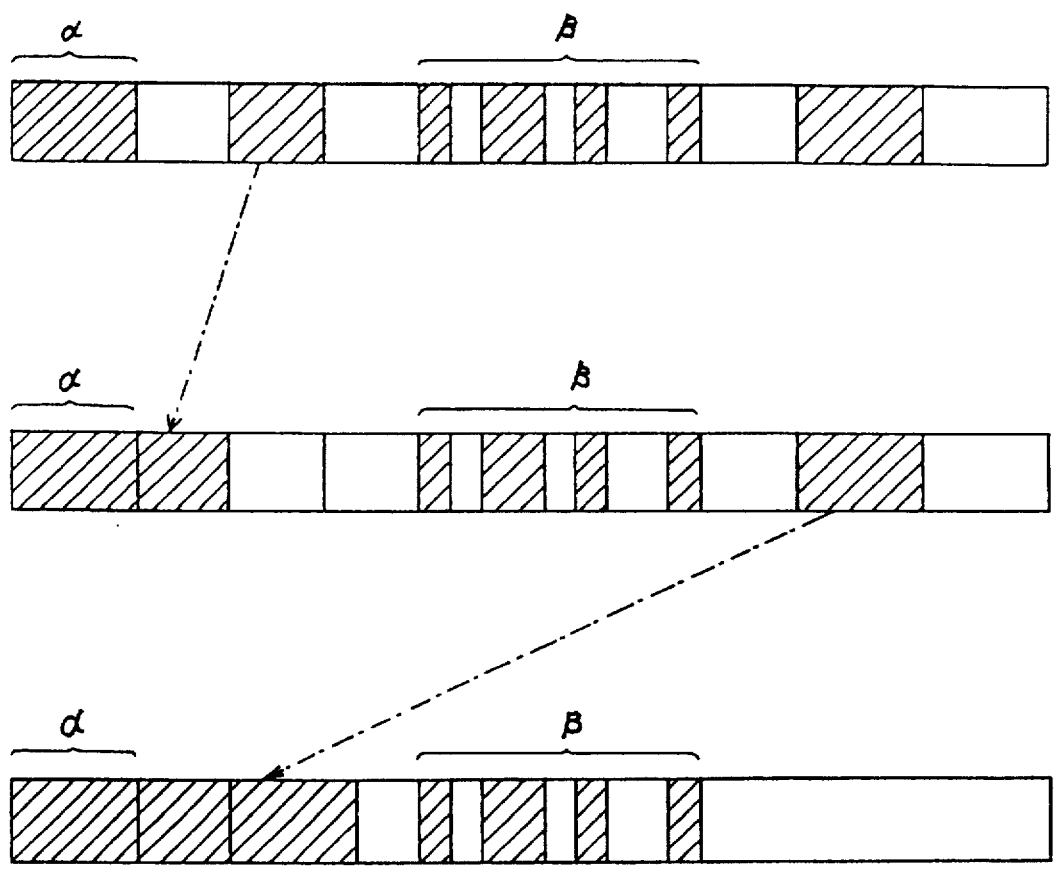
FIG. 19 shows the condense processing.
Figure 20:
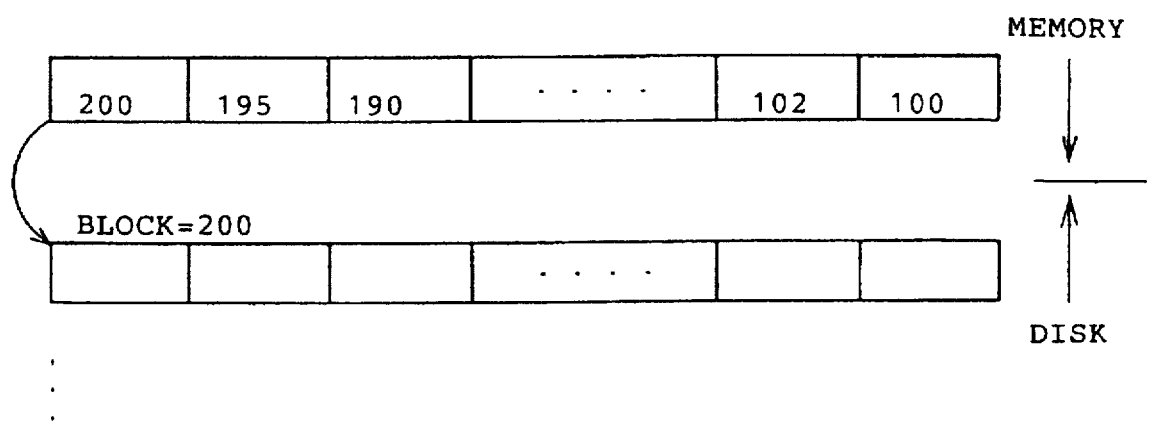
FIG. 20 shows the conventional technique.
Figure 21:
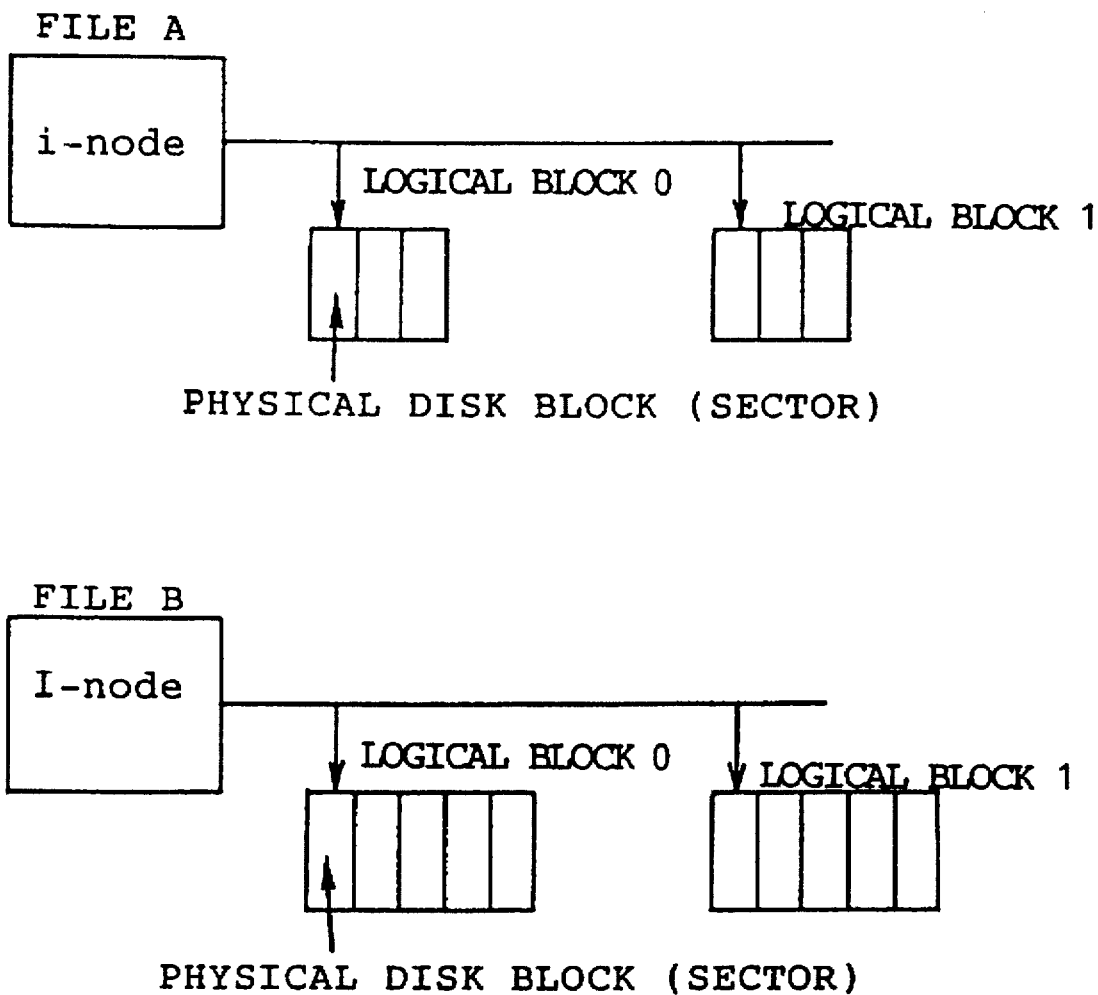
FIG. 21 shows the block configuration in the file.

This condense processing employs the mechanism to also move areas used for free physical disk block spaces to be allocated to a normal file (λ and β in FIG. 17, in practice, the β area). In this area, however, free physical disk block spaces and physical disk block spaces in use are mixed together. Accordingly, by implementing the mechanism to replace the block address indicated by i-node number with a new block number in this area the load of the system becomes heavy. A possible solution to this problem is not to cover such areas for the condense processing, as shown in FIG. 19.

Although an explanation of the illustrated embodiment is described, this invention is not limited to this embodiment. By way of example, the embodiment presents the mechanism that the list for extended file allocation 30 manages a start block number of sequential empty physical disk block spaces. This invention, however, is not limited to start block number, an end block number can also be managed.

This embodiment also presents the mechanism to sort the entry data in the list for extended file allocation 30, or in the second list for normal file allocation 33, according to the number of sequential blocks if any change is made to the entry data. The sort unit is expected to speed up an allocation of sequential empty physical disk block spaces to a normal file. This invention, however, does not always need to include the sort unit.

This embodiment further presents the mechanism to divide disk block space areas into an area used for free physical disk block spaces to be allocated to an extended file, and an area used for free physical disk block spaces to be allocated to a normal file on the disk 2. This invention, however, is not limited to this mechanism. The mechanism to divide into an area used for a small number of sequential empty physical disk block spaces and an area used for a large number of sequential empty physical disk block spaces on the disk 2, can also be utilized.

As described above, this invention enables one logical block of a file to correspond to an arbitrary number of sequential physical disk block spaces. Therefore, this invention significantly reduces the number of head searches and the latency speed for disk during file access.

Furthermore, this invention can concentrate physical disk block spaces to be allocated to a file in a specific area on a disk. Therefore, this invention significantly reduces the number of head searches and the latency speed for a disk during file access.

What is claimed is:

1. Apparatus for managing free physical disk block spaces and allocating free physical disk block spaces to a file comprising:

extended management means comprising an allocation list formed in a memory for managing a start block number and a sequential block number for sequential empty physical disk block spaces having specified entries and utilized for an extended file whose logical block size is an integral multiple of a physical disk block size; and allocation means for finding sequential empty physical disk block spaces whose sequential block number is greater than the number requested according to management data provided by said extended management means when a request to secure free physical blocks is made and allocating as many sequential empty physical disk block spaces as requested to a file.

2. The apparatus of claim 1 further comprising: update means for updating said management data of said extended management means so that said extended management means can manage a greater number of sequential empty physical disk block spaces whenever releasing logical blocks included in said extended file.

3. The apparatus of claim 1 further comprising:

sort means for sorting said management data provided by said extended management means according to the sequential block number if any change is made to the management data.

4. The apparatus of claim 3, wherein said sort means sequentially sorts management data of said second management means according to the sequential block number if any change is made to the management data if the second management is utilized.

5. An apparatus for managing free physical disk block spaces and allocating free physical disk block spaces to a file comprising:

extended management means comprising an allocation list formed in a memory for managing a start block number and a sequential block number for sequential empty physical disk block spaces having specified entries and utilized for an extended file whose logical block size is an integral multiple of a physical disk block size;

allocation means for finding sequential empty physical disk block spaces whose sequential block number is greater than the number requested according to management data provided by said extended management means with spaces as requested to a file; and update means for updating said management data of said extended management means so that said extended management means can manage a greater number of sequential empty physical disk block spaces whenever releasing logical blocks included in said extended file, wherein said update means records sequential empty physical disk block space information included in a logical block whose block size is greater than a specified threshold if there is free space in said extended management means and replaces existing smaller number of sequential empty physical disk block spaces with a greater number of blocks if there is no space in said extended management means and the sequential block number of said sequential empty disk block space is greater than the recorded number.

6. An apparatus for managing free physical disk block spaces and allocating free physical disk block spaces to a file comprising:

extended management means comprising an allocation list formed in a memory for managing a start block number and a sequential block number for sequential empty physical disk block space having specified entries and utilized for an extended file whose logical block size is an integral multiple of a physical disk block size;

first management means for managing block numbers of free physical disk block spaces that are not covered by said extended management means;

second management means for managing start block number and sequential block number for sequential empty physical disk block spaces that are managed by said first management means;

allocation means for finding sequential empty physical disk block spaces whose sequential block number is greater than the number requested according to management data provided by said second management means and said extended management means when acquisition request is made and allocating as many sequential empty physical disk block spaces as requested to a file; and update means for updating said management data of sequential empty physical disk block spaces whenever releasing logical blocks included in said extended file, wherein said update means records sequential empty physical disk block space information included in a logical block whose block size is greater than a specified threshold if there is free space in said extended management means and replaces existing smaller number of sequential empty physical disk block spaces with a greater number of blocks if there is no space in said extended management means and the sequential block number of said sequential empty disk block space is greater than the recorded number.

7. Apparatus for managing free physical disk block spaces and allocating free physical disk block spaces to a file comprising:

extended management means including an allocation list formed in a memory for managing a start block number and a sequential block number for sequential empty physical disk block space having specified entries and utilized for an extended file whose logical block size is an integral multiple of a physical disk block size;

first management means for managing block numbers of free physical disk block spaces that are not covered by said extended management means;

second management means for managing start block number and sequential block number for sequential empty physical disk block spaces that are managed by said first management means;

allocation means for finding sequential empty physical disk block spaces whose sequential block number is greater than the number requested according to management data provided by said second management means and said extended management means when acquisition request is made and allocating as many sequential empty physical disk block spaces as requested to a file, wherein said allocation means gives priority to said second management means if an acquisition request number is less than a specified threshold, finds sequential empty physical disk block spaces whose sequential block number is greater than the acquisition request number according to said management data provided by said second management means and said extended management means, and performs the processing to find sequential empty physical disk block spaces whose block number is greater than the acquisition request number according to the management data recorded in said extended management data if the acquisition request number is greater than the specified threshold.

8. The apparatus of claim 7 further comprising change means for changing management data of said second management means when free physical disk block spaces are found and allocated to a file according to management data provided by said first management means and changes said management data of said first management means when free physical disk block spaces are found and allocated to a file according to management data provided by said second management means.

9. The apparatus of claim 7 comprising update means for updating said management data of said extended management means so that said extended management means can manage a greater number of sequential empty physical disk block spaces whenever releasing logical blocks included in said extended file.

10. The apparatus of claim 7 further comprises sort means for sorting said management data provided by said extended management means according to the sequential block number if any change is made to the management data.

11. The apparatus of claim 10, wherein said sort means sequentially sorts management data of said second management means according to the sequential block number if any change is made to the management data if the second management is utilized.

* * * * *